United States Patent [19]

Kami et al.

[11] Patent Number: 4,662,237

[45] Date of Patent: May 5, 1987

[54] ACTUATING DEVICE FOR AUTOMOBILES

[75] Inventors: Yozo Kami, Saitama; Mitsu Kojima, Tokyo, both of Japan

[73] Assignee: Honda Giken Kogyo Kabushiki Kaisha, Tokyo, Japan

[21] Appl. No.: 611,019

[22] Filed: May 16, 1984

[30] Foreign Application Priority Data

May 16, 1983 [JP] Japan .............................. 58-72867[U]

[51] Int. Cl.$^4$ ................................................ G05G 1/14
[52] U.S. Cl. ........................................ 74/512; 74/513; 74/560; 60/594; 92/161; 180/90
[58] Field of Search ............... 74/512, 478, 560, 561, 74/513; 248/274; 180/315, 90, 90.6; 60/533, 594; 92/128, 161, 146

[56] References Cited

U.S. PATENT DOCUMENTS

| | | | |
|---|---|---|---|
| 1,919,968 | 7/1933 | Trabold | 74/560 |
| 2,129,851 | 9/1938 | Lee | 74/512 X |
| 2,688,262 | 9/1954 | Bolton | 74/478 |
| 2,869,392 | 1/1959 | Muller | 74/512 |
| 2,942,493 | 6/1960 | Barth | 74/560 X |
| 3,104,741 | 9/1963 | McDougal | 74/531 X |
| 3,108,651 | 10/1963 | Miller | 180/90.6 |
| 3,125,896 | 3/1964 | Beisel et al. | 74/560 |
| 3,714,780 | 2/1973 | Shellhause | 60/594 |
| 4,353,430 | 10/1982 | Sjoqvist et al. | 74/512 X |
| 4,463,843 | 8/1984 | Taig | 74/501.5 R X |

Primary Examiner—Gary L. Smith
Assistant Examiner—Rodney M. Lindsey
Attorney, Agent, or Firm—Lyon & Lyon

[57] ABSTRACT

A actuating device for a vehicle, especially an automobile, in which an actuating device such as a hydraulic brake master cylinder and booster, is arranged to extend within an engine room at an angle to the longitudinal direction of the automobile body to fit in a restricted space and has its rear end portion protruding into the operator compartment. A pedal arm is supported on the rear end portion of said actuator by a hinge pin arranged in a plane substantially normal to the center line of the actuator, but is inclined with respect to a horizontal plane such that the moving locus of the foot pedal at the rear end of the pedal arm generally follows a longitudinal vertical plane to provide a normal motion for the operator's foot during movement.

7 Claims, 5 Drawing Figures

ACTUATING DEVICE FOR AUTOMOBILES

The present invention relates to a actuating device for an automobile and, more particularly, to a actuating device of the type in which an actuator arranged to extend within an engine room in the longitudinal direction of a vehicle, such as a car, body and to have its rear end portion protruding into a compartment is fastened to the dash board of the vehicle body and in which a pedal arm is supported on the rear end portion of the actuator through a hinge pin arranged in a plane substantially normal to the center line of the actuator.

For actuators that are very long or if the space in the engine room is restricted or narrow, there arises a problem that the actuator and the engine or its accessories interfere with each other.

It is an object of the present invention to provide a simple and effective actuating device in which, even if the longitudinal center line of said actuator is inclined with respect to a vertical plane containing the longitudinal center line of the vehicle body as to obviate the aforementioned interference and the movement of the pedal is not offset transversely of the vehicle body whereby the driver's feeling is substantially similar to the prior art having the actuator longitudinally aligned with vehicle.

The present invention will be described in the following in connection with one embodiment thereof with reference to the accompanying drawings.

Figure 1:
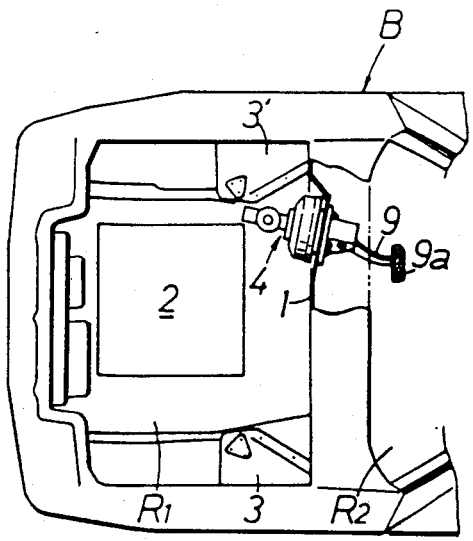
FIG. 1 is a top plan view showing a portion of an automobile which is equipped with a pedal actuating device according to one embodiment of the present invention.
Figure 2:
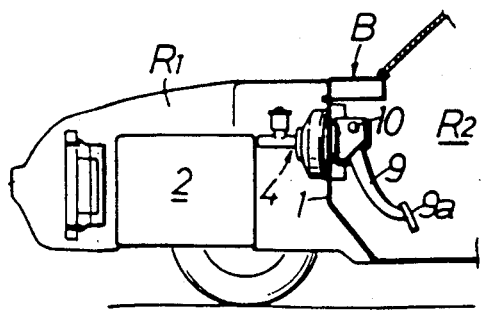
FIG. 2 is a longitudinal sectional side elevation of the automobile of FIG. 1.

As shown in FIGS. 1 and 2, a car body B is formed at its front portion with an engine room $R_1$ and at its rear portion with a compartment $R_2$, which are partitioned by a dash board 1 forming a part of the car body B. In the engine room $R_1$, there are respectively arranged an engine 2 at a central portion, a pair of spring and shock absorber housings 3 and 3' at both right and left corners adjoining the dash board 1, and an actuator 4 for use with the pedal actuating device according to the present invention adjacent to the righthand rear portion of the engine 2.

The actuator 4 is constructed of a tandem type brake master cylinder 5, a vacuum booster 6 joined to the rear end portion of the master cylinder 5, and a pedal bracket 7 fastened to the rear end portion of the booster 6 by means of bolts 8. The actuator 4 is mounted on the dash board 1 such that the dash board 1 is sandwiched between the booster 6 and the pedal bracket 7. As a result, there is arranged in the compartment $R_2$ the pedal bracket 7 on which a pedal arm 9 is supported through a hinge pin 10. The pedal arm 9 actuates the booster 6, when it is pivoted forward on the hinge pin 10 by depressing its foot pedal 9a, to boost the brake master cylinder 5 so that the not-shown wheel brakes can be actuated.

Figure 3:
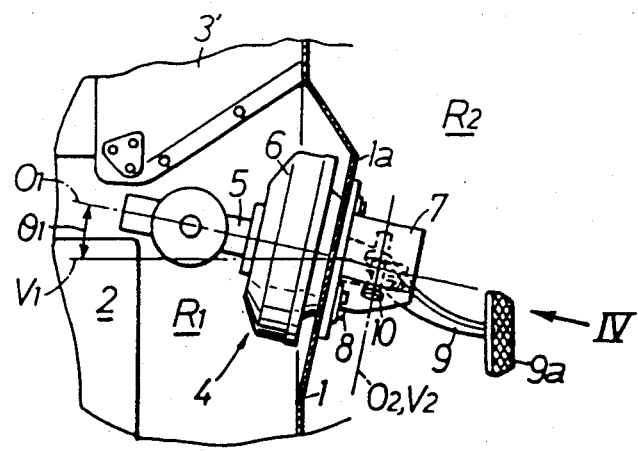
FIG. 3 is an enlarged view showing an essential portion of FIG. 1.

As clearly seen from FIG. 3, the total length of the brake master cylinder and the booster 6 is larger than the spacing between the engine 2 and the dash board 1. In order to position the front end portion of the brake master cylinder 5 between the engine 2 and the righthand housing 3', the actuator 4 is arranged such that its longitudinal center line $O_1$ is inclined at an angle $\theta_1$ with respect to a vertical plane $V_1$ containing the longitudinal center line of the car body B. Because of this inclined arrangement, in the shown embodiment, the wall 1a of the dash board 1 for mounting the booster 6 is recessed at an inclination into the compartment $R_2$.

Figure 4:
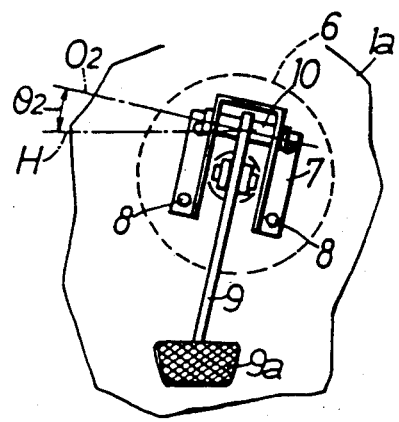
FIG. 4 is a view taken in the direction of arrow IV of FIG. 3.

Moreover, the aforementioned hinge pin 10 is arranged such that its center line $O_2$ is generally contained in a plane normal to the center line $O_1$ of the actuator 4, i.e., a normal plane $V_2$, of the center line $O_1$ and inclined at an angle $\theta_2$ rightwardly downward of the car body B with respect to a horizontal plane H (as shown in FIG. 4).

The positioning of the center line $O_2$ of the hinge pin 10 in the plane $V_2$ normal to the center line $O_1$ of the actuator 4 is a necessary requirement for transmitting the operating force of the pedal arm 9 to the input lever of the booster 6 without creating difficulty which is well known in the prior art.

Figure 5:
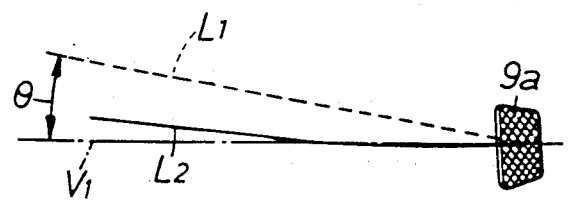
FIG. 5 is a view showing the moving loci of the pedal in different arrangements for comparison.

With the actuator 4 arranged at an inclination, as has been described hereinbefore, it normally would be assumed that the center line $O_2$ of the hinge 10 should be horizontally arranged, as in the prior art. With such an arrangement the locus $L_1$ of the foot pedal 9a, which follows the turn of the pedal arm 9, as viewed from above, would be inclined at an angle $\theta$ with respect to the vertical plane $V_1$ containing the longitudinal center line of the car body B, as shown in FIG. 5. As a result, the foot pedal 9a moves to the right as it is depressed forward, which is an uncomfortable feeling for the driver.

According to the present device, since the center line $O_2$ of the hinge pin 10 is inclined at the angle $\theta_2$ rightwardly downward of the car body B with respect to the horizontal plane H, the rightward offset of the aforementioned locus $L_1$ of the pedal 9a is corrected by that inclination so that the pedal 9a draws a slightly curved locus $L_2$ that generally follows the vertical plane $V_1$ containing the longitudinal center line of the car body B.

As has been described hereinbefore, according to the present device, the longitudinal center line of the actuator is inclined with respect to the vertical plane containing the longitudinal center line of the car body. As a result, even if the actuator is elongated or if the engine room is narrowed, the interference between the actuator and the engine or its accessories can be obviated. Moreover, the center line of the hinge pin of the pedal arm is inclined with respect to the horizontal plane so that the moving locus of the pedal at the rear end of the pedal arm may generally follow the vertical plane containing the longitudinal center line of the car body. As a result, despite the inclined arrangement of the actuator, the pedal can draw the moving locus substantially identical to that of the prior art while making the driver feel no sense of incompatibility. Furthermore, the construction is no more complicated than the prior art.

We claim:

1. An actuating device for a vehicle comprising an actuator arranged to extend within a engine room and having a longitudinal center line of actuating movement at a relatively small angle from a vertical plane extending parallel to the longitudinal center line of the vehicle and to have its rear end portion protruding into an operator compartment with the actuator fastened to a dashboard of the vehicle, and a rearwardly and downwardly extending foot pedal arm supported on the rear end portion of said actuator through a hinge pin having a center line arranged in a plane substantially normal to the center line of said actuator, the improvement comprising, positioning the longitudinal center line of said actuator at an angle inclined with respect to a vertical plane containing the longitudinal center line of the vehicle, and positioning the center line of said hinge pin at an angle inclined with respect to both the vertical plane containing the longitudinal center line of the vehicle and a horizontal plane such that the moving locus of a foot pedal at the extending end of said pedal arm substantially follows said vertical plane.

2. An actuating device for an automobile, comprising, an actuator having a center line arranged to extend within an engine room at an angle to a vertical plane extending in the longitudinal direction of the automobile and to have its rear end portion protruding into an operator compartment, a pedal arm supported on the rear end portion of said actuator by a hinge pin arranged in a plane substantially normal to the center line of said actuator, the pedal arm having a foot pedal on the extending end spaced from said hinge pin, said hinge pin having its center line inclined with respect to a horizontal plane such that the moving locus of said foot pedal substantially follows a vertical plane that is coincident with said longitudinal direction of the automobile.

3. The device of claim 2 wherein said foot pedal is generally perpendicular to the said longitudinal direction.

4. The actuating device of claim 1 wherein the vehicle is an automobile.

5. The actuating device of claim 1 wherein the vehicle is a truck.

6. The actuating device of claim 1 wherein the actuating device is a brake actuating device.

7. The actuating device of claim 1 wherein the actuating device is a clutch actuating device.

* * * * *